United States Patent Office 3,294,522
Patented Dec. 27, 1966

3,294,522
COMPOSITION AND METHOD FOR DESICCATING, DEFOLIATING AND DESTROYING PLANTS
Ivan C. Popoff, Ambler, Pa., assignor to Pennsalt Chemicals Corporation, Philadelphia, Pa., a corporation of Pennsylvania
No Drawing. Original application Dec. 6, 1963, Ser. No. 328,511. Divided and this application Oct. 21, 1965, Ser. No. 545,175
25 Claims. (Cl. 71—2.7)

This is a division of application Serial No. 328,511, filed December 6, 1963.

This invention relates to novel dialkylcarbamylphosphonic diamides and dialkylthiocarbamylphosphonic diamides and to their uses as plant desiccants, defoliants and herbicides and as pesticides.

More specifically, the invention relates to compounds of the general formula $$\begin{array}{c} R \\ R^1-N' \\ R \\ R^1-N'' \end{array} P-\overset{O}{\overset{\|}{C}}-N\begin{array}{c} Y \\ R^2 \\ R^3 \end{array}$$

in which each of $R^1$, $R^2$ and $R^3$ is hydrocarbon or substituted hydrocarbon radical; R is hydrogen or any hydrocarbon or substituted hydrocarbon radical; and Y is oxygen or sulfur radical. $R^1$, $R^2$ and $R^3$ are the same or different and R is hydrogen or the same or a different $R^1$, $R^2$ and $R^3$ hydrocarbon or substituted hydrocarbon radical. Y is preferably sulfur radical.

When any of R, $R^1$, $R^2$ and $R^3$ is a hydrocarbon radical, it preferably is a lower alkyl with from 1 to about 12 carbon atoms, but can also be phenyl. $R^2$ and $R^3$ together can be alkylene with from 2 to 12 carbon atoms. When any of R, $R^1$, $R^2$ and $R^3$ is phenyl, it can be substituted with alkyl with from 1 to about 12 carbon atoms; halogen, preferably chlorine; —$NO_2$; and —COOR in which R is alkyl with from 1 to about 6 carbon atoms.

Specific compounds to which this invention is directed are N,N-diethylthiocarbamylphosphonic N',N',N'',N''-tetraethyldiamide and N,N - diethylcarbamylphosphonic N',N',N'',N''-tetraethyldiamide.

The dialkylthiocarbamylphosphonic diamides are prepared by reacting at an elevated temperature, e.g. 50–250° C., an alkyl phosphorodiamidite of the formula:

$$\begin{array}{c} R \\ R^1-N'' \\ R \\ R^1-N' \end{array} P-O-R^4$$

in which R and $R^1$ are the same as defined above and $R^4$ is defined the same as $R^1$, $R^2$ and $R^3$ above, and preferably is methyl, ethyl, propyl, isopropyl or butyl, with a thiocarbamyl halide of the formula $$\begin{array}{c} R^2 \\ R^3 \end{array} N-\overset{S}{\overset{\|}{C}}-X$$

in which $R^2$ and $R^3$ are the same as defined above and X is halogen, preferably chlorine.

The reactants are mixed together, preferably in the absence of solvent. However, a solvent can be used to practice the invention.

The dialkylcarbamylphosphonic diamides are prepared in a way similar to that described above by reacting at an elevated temperature, e.g. 50–250° C. an alkylphosphorodiamidite as defined above with a carbamyl halide of the formula $$\begin{array}{c} R^2 \\ R^3 \end{array} N-\overset{O}{\overset{\|}{C}}-X$$

in which $R^2$ and $R^3$ are the same as defined above and X is a halogen as defined above.

By-product $R^4X$, e.g. an alkyl halide such as ethyl chloride, is formed and is preferably removed continuously during the course of the reaction.

The dialkylthiocarbamylphosphonic diamides and dialkylcarbamylphosphonic diamides are high boiling liquids which can be recovered from the reaction mass in pure form by distillation, preferably under vacuum.

The method of preparation of a dialkylthiocarbamylphosphonic diamide can be understood from the following equation in which R, $R^1$, $R^2$ and $R^3$ of the general formulae above are each ethyl, X is chlorine and Y is sulfur:

$$\begin{array}{c} C_2H_5 \\ C_2H_5 \\ C_2H_5 \\ C_2H_5 \end{array} \begin{array}{c} N'' \\ N' \end{array} P-O-C_2H_5 + \begin{array}{c} C_2H_5 \\ C_2H_5 \end{array} N-\overset{S}{\overset{\|}{C}}-Cl \longrightarrow$$

$$\begin{array}{c} C_2H_5 \\ C_2H_5 \\ C_2H_5 \\ C_2H_5 \end{array} \begin{array}{c} N'' \\ N' \end{array} P-\overset{O}{\overset{\|}{C}}-N\begin{array}{c} S \\ C_2H_5 \\ C_2H_5 \end{array} + C_2H_5Cl$$

The method of preparation of a dialkylcarbamylphosphonic diamide is the same as depicted above except that a carbamyl halide is used in place of the thiocarbamyl halide.

The alkyl phosphorodiamidites used in preparing the novel compounds of the invention are known in the art and/or can be made by the method of Arbuzov and Michaelis taught in Kosolapoff, "Organophosphorus Compounds," John Wiley & Sons, Inc., N.Y. (1950), particularly chapter 10.

The carbamyl halides and thiocarbamyl halides are also well-known in the art or can readily be prepared by known methods.

Examples of alkyl phosphorodiamidites especially preferred for practice of this invention are the following:

methyl N',N',N'',N''-tetramethylphosphorodiamidite
ethyl N',N',N'',N''-tetraethylphosphorodiamidite
propyl N',N',N'',N''-tetrapropylphosphorodiamidite
isopropyl N',N',N'',N''-tetraisopropylphosphorodiamidite
butyl N',N',N'',N''-tetrabutyl phosphorodiamidite
isobutyl N',N',N'',N''-tetraisobutylphosphorodiamidite
amyl N',N',N'',N''-tetraamylphosphorodiamidite
isoamyl N',N',N'',N''-tetraisoamylphosphorodiamidite
hexyl N',N',N'',N''-tetrahexylphosphorodiamidite
isohexyl N',N',N'',N''-tetraisohexylphosphorodiamidite
phenyl N',N',N'',N''-tetraethylphosphorodiamidite
ethyl N',N',N'',N''-tetraphenylphosphorodiamidite
ethyl N',N'-diphenyl-N'',N''-diethylphosphorodiamidite
ethyl N'-ethyl-N'-phenyl-N''-ethyl-N''-phenylphosphorodiamidite
ethyl N',N',N'',N''-tetrapropylphosphorodiamidite
ethyl N',N'-chlorophenyl-N'',N''-diamylphosphorodi-
ethyl N',N''-dicyclopentadienylenephosphorodiamidite
ethyl N',N',N'',N''-tetrakis(nitrophenyl)phosphorodiamidite ethyl N',N',N'',N''-tetrakis(chlorophenyl)phosphorodiamidite
ethyl N',N''-bis(ethylene)phosphorodiamidite Examples of carbamyl halides especially preferred for practice of this invention are the following:

N,N-dimethylcarbamyl fluoride
N,N-dimethylcambamyl chloride
N,N-diethylcarbamyl fluoride
N,N-diisopropylcarbamyl bromide
N,N-diisopropylcarbamyl chloride
N,N-diisopropylcarbamyl fluoride
N,N-dibutylcarbamyl chloride
N,N-dibutylcarbamyl fluoride
N,N-diisobutylcarbamyl chloride
N,N-diisobutylcarbamyl fluoride
N,N-diamylcarbamyl chloride
N,N-diamylcarbamyl fluoride
N,N-dihexylcarbamyl chloride
N,N-dihexylcarbamyl fluoride
N,N-diisohexylcarbamyl chloride
N,N-diisohexylcarbamyl fluoride
N,N-diphenylcarbamyl chloride
N,N-diphenylcarbamyl fluoride
N-methyl-N-ethylcarbamyl chloride
N-ethyl-N-phenylcarbamyl chloride
N-ethyl-N-phenylcarbamyl fluoride
N-isopropyl-N-phenylcarbamyl fluoride
N-isopropyl-N-phenylcarbamyl chloride
N,N-bis(chlorophenyl)carbamyl chloride
N,N-bis(chlorophenyl)carbamyl fluoride
N,N-bis(nitrophenyl)carbamyl chloride
N,N-bis(nitrophenyl)carbamyl fluoride Examples of especially preferred thiocarbamyl halides are the following:

N,N-dimethylthiocarbamyl chloride
N,N-dimethylthiocarbamyl fluoride
N,N-diethylthiocarbamyl chloride
N,N-diethylthiocarbamyl fluoride
N,N-diisopropylthiocarbamyl bromide
N,N-diisopropylthiocarbamyl chloride
N,N-diisopropylthiocarbamyl fluoride
N,N-dibutylthiocarbamyl chloride
N,N-dibutylthiocarbamyl fluoride
N,N-diisobutylthiocarbamyl chloride
N,N-diisobutylthiocarbamyl fluoride
N,N-diamylthiocarbamyl chloride
N,N-diamylthiocarbamyl fluoride
N,N-dihexylthiocarbamyl chloride
N,N-dihexylthiocarbamyl fluoride
N,N-diisohexylthiocarbamyl chloride
N,N-diisohexylthiocarbamyl fluoride
N,N-diphenylthiocarbamyl chloride
N,N-diphenylthiocarbamyl fluoride
N-methyl-N-ethylthiocarbamyl chloride
N-ethyl-N-phenylthiocarbamyl chloride
N-ethyl-N-phenylthiocarbamyl fluoride
N-isopropyl-N-phenylthiocarbamyl fluoride
N-isopropyl-N-phenylthiocarbamyl chloride
N,N-bis(chlorophenyl)thiocarbamyl chloride
N,N-bis(chlorophenyl)thiocarbamyl fluoride
N,N-bis(nitrophenyl)thiocarbamyl chloride
N,N-bis(nitrophenyl)thiocarbamyl fluoride Examples of preferred dialkylcarbamylphosphonic diamides especially preferred for the practice of this invention are the following:

N,N-dimethylcarbamylphosphonic N',N',N'',N''-tetramethyldiamide
N,N-diethylcarbamylphosphonic N',N',N'',N''-tetraethyldiamide
N,N-dipropylcarbamylphosphonic N',N',N'',N''-tetrapropyldiamide
N,N-diisopropylcarbamylphosphonic N',N',N'',N''-tetraisopropyldiamide
N,N-diamylcarbamylphosphonic N',N',N'',N''-tetraamyldiamide
N,N-diisoamylcarbamylphosphonic N',N',N'',N''-tetraisoamyldiamide
N,N-dihexylcarbamylphosphonic N',N',N'',N''-tetrahexyldiamide
N,N-diisohexylcarbamylphosphonic N',N',N'',N''-tetraisohexyldiamide
N,N-diphenylcarbamylphosphonic N',N',N'',N''-tetraethyldiamide
N,N-diethylcarbamylphosphonic N',N',N'',N''-tetraisopropyldiamide
N-methyl-N-ethylcarbamylphosphonic N',N',N'',N''-tetraethyldiamide
N,N-bis(chlorophenyl)carbamylphosphonic N',N',N'',N''-tetrakis(chlorophenyl)diamide
N,N-bis(nitrophenyl)carbamylphosphonic N',N',N'',N''-tetraisopropyldiamide
N,N-diisopropylcarbamylphosphonic N',N',N'',N''-tetrakis(nitrophenyl)diamide Examples of preferred dialkylthiocarbamylphosphonic diamides especially preferred for the practice of this invention are the following:

N,N-dimethylthiocarbamylphosphonic N',N',N'',N''-tetramethyldiamide
N,N-diethylthiocarbamylphosphonic N',N',N'',N''-tetraethyldiamide
N,N-dipropylthiocarbamylphosphonic N',N',N'',N''-tetrapropyldiamide
N,N-diisopropylthiocarbamylphosphonic N',N',N'',N''-tetraisopropyldiamide
N,N-diamylthiocarbamylphosphonic N',N',N'',N''-tetraamyldiamide
N,N-diisoamylthiocarbamylphosphonic N',N',N'',N''-tetraisoamyldiamide
N,N-dihexylthiocarbamylphosphonic N',N',N'',N''-tetrahexyldiamide
N,N-diisohexylthiocarbamylphosphonic N',N',N'',N''-tetraisohexyldiamide
N,N-diphenylthiocarbamylphosphonic N',N',N'',N''-tetraethyldiamide
N,N-diethylthiocarbamylphosphonic N',N',N'',N''-tetraisopropyldiamide
N-methyl-N-ethylthiocarbamylphosphonic N',N',N'',N''-tetraethyldiamide
N,N-bis(chlorophenyl)thiocarbamylphosphonic N',N',N'',N''-tetrakis(chlorophenyl)diamide
N,N-bis(nitrophenyl)thiocarbamylphosphonic N',N',N'',N''-tetraisopropyldiamide
N,N-diisopropylthiocarbamylphosphonic N',N',N'',N''-tetrakis(nitrophenyl)diamide Inert solvents which can be used in practice of the invention include aromatic hydrocarbons, preferably benzene, toluene, xylene. Other inert solvents having a boiling point above 50° C. can also be used, e.g. dioxane, tetrahydrofuran and chlorobenzene.

An elevated temperature, i.e. one between about 80° and 250° C., is preferably used in carrying out the reaction. A temperature corresponding to the reflux temperature of the solvent is especially preferred when a solvent is used.

Pressure is not critical. However, to promote the reaction by removal of the organic halide by-product formed, operation of the reaction at ambient pressure or under a slight vacuum is preferred.

The practice of the invention can be understood from the following examples.

*Example 1.—Preparation and characterization of N,N-diethylthiocarbamylphosphonic N',N',N'',N'' - tetraethyldiamide*

75 parts (0.34 mole) of ethyl N',N',N'',N''-tetraethylphosphorodiamidite and 47 parts (0.31 mole) of N,N-diethylthiocarbamyl chloride were mixed together in a vessel at room temperature. The mixture was then heated slowly to 135° C. and held at 135°–150° C. for about one hour. During the heating up stage, evolution of a gas was observed at about 80° C. and at 100° C. ethyl chloride began to condense in the Dry Ice trap of the apparataus. A total of 13.1 parts, 65.6% of the theoretical amount of by-product ethyl chloride expected to be formed, was collected. Crude N,N-diethylthiocarbamylphosphonic N',N',N'',N''-tetraethyldiamide product amounting to 94 parts was recovered. The product was distilled under vacuum and about 64 parts recovered at 120–126° C. at 0.025–0.075 mm. The product has an unpleasant odor. It is soluble in acetone, and is insoluble in water.

Analysis of the compound gave the following results.

Percent calculated:
C _____ 50.79
H _____ 9.84
N _____ 13.67

Percent found:
C _____ 50.95
H _____ 10.12
N _____ 13.45

Identity of the compound as N,N-diethylthiocarbamylphosphonic N',N',N'',N''-tetraethyldiamide was further confirmed by determination of its infrared spectrum, which showed the following characteristic absorptions:

1475 cm.$^{-1}$, >N—C(S)—
1295 and 1267 cm.$^{-1}$, —N(C$_2$H$_5$)$_2$
1218, 1206, 1183 cm.$^{-1}$, P→O
1174, 1021, 953 cm.$^{-1}$, P—N

*Example 2.—Preparation and characterization of N,N-diethylcarbamylphosphonic N',N',N'',N'' - tetraethyldiamide*

42 parts (0.31 mole) of N,N-diethylcarbamyl chloride and about 80 parts of ethyl N',N',N'',N''-tetraethylphosphorodiamidite were mixed together in a vessel and heated gradually to an elevated temperature. Gas evolution was observed at about 110° C. At about 122° C. ethyl chloride began to condense in the Dry Ice trap of the apparatus. The reaction mass then was heated to 150° and held there for about ½ hour. The temperature was then raised to 170° and held there for 1 hour. 8.3 parts (41.4% of that theoretically expected) of ethyl chloride were collected. The reaction mass was filtered and about 90 parts of filtrate were recovered. On distillation of the filtrate, 16.8 parts (18.6% of that theoretically expected) were recovered as product boiling at 95.5°–98° C. at 0.008 mm.

Analysis of the compound gave the following results.

Percent calculated:
C _____ 53.59
H _____ 10.38
N _____ 14.42

Percent Found:
C _____ 53.72
H _____ 10.84
N _____ 14.80

Identity of the compound as N,N-diethylcarbamylphosphonic N',N',N'',N''-tetraethyldiamide was further confirmed by determination of its infrared spectrum, which showed the following characteristic absorptions:

1592 cm.$^{-1}$, >N—C(O)—
1261 cm.$^{-1}$, —N(C$_2$H$_5$)$_2$
1217, 1205, 1185 cm.$^{-1}$, P→O
1166, 1022, 949 cm.$^{-1}$, P—N

The novel compounds of this invention are useful for desiccation, defoliation, and killing of plants, as can be seen from the following examples in which formulations of the active compounds were prepared and applied in the form of diluted sprayable solutions or dispersions to two-week old Black Valentine bean plants.

Concentrated formulations first were prepared as follows.

Formulation A:                                          Parts by weight
    Active compound _____ 10
    Xylene _____ 85
    Alkyl aryl polyether glycol surfactant (Triton
      X-155) _____ 5
Formulation B:
    Active compound _____ 5
    Acetone _____ 95

*Example 3*

A stock solution of N,N-diethylthiocarbamylphosphonic N',N',N'',N''-tetraethyldiamide was prepared according to formulation A. A portion of the stock solution then was diluted with sufficient light hydrocarbon oil to make a sprayable solution of the above compound. The latter solution was sprayed on two-week old Black Valentime been plants at application rates equivalent to 0.1, 1.0 and 10 lbs. of the compound per acre at concentrations of 0.04%, 0.4% and 4.0% of the compound, respectively.

At 0.1 lb. per acre, 5% of the leaves were desiccated in 4 days; and 25% of the leaves abscissed in 21 days.

At 1.0 lb. per acre, about 30% of the leaves were desiccated in 7 days; 87.5% of the leaves abscissed in 14 days and 100% in 21 days.

At 10 lbs. per acre, 100% of the leaves were desiccated in 1 day. At the end of 14 days, the plants were dying, but at the end of 21 days the plants were still not completely dead.

*Example 4*

A portion of the stock solution of Example 3 was diluted with water to make a sprayable dispersion of N,N-diethylthiocarbamylphosphonic N',N',N'',N''-tetraethyldiamide and sprayed on two-week old Black Valentine beans at application rates equivalent to 0.1, 1.0 and 10.0 lbs. of compound per acre and at concentrations of 0.02%, 0.2% and 2.0% of the compound, respectively.

At 0.1 lb. per acre, no activity was observed.

At 1.0 lb. per acre, about 8% of the leaves were desiccated the first day and about 11% by the 7th day; 25% in 21 days.

At 10.0 lbs. per acre, 100% of the leaves were desiccated on the first day; terminal buds were dead at the end of 4 days; the plants were dying at the end of 14 days; and 100% of the plants were dead at the end of 21 days.

*Example 5*

A stock solution of N,N-diethylcarbamylphosphonic N',N',N'',N''-tetraethyldiamide was prepared according to formulation A. A portion of the stock solution then was diluted with sufficient water to make a sprayable dispersion of the above compound. The latter dispersion was sprayed on two-week old Black Valentine bean plants at application rates equivalent to 0.1, 1.0 and 10.0 lbs. of the compound per acre at concentrations of 0.02%, 0.2% and 2.0%, respectively.

At 0.1 lb. per acre, no activity was observed.

At 1.0 lb. per acre, 12.5% of the leaves abscissed in 21 days.

At 10 lbs. per acre, 95% of the leaves were desiccated the first day and 100% by the end of the second day. At the end of 3 days, 50% of the leaves had abscissed and 100% abscissed in 21 days. Terminal buds were found dead after 7 days.

*Example 6*

A stock solution of N,N-diethylcarbamylphosphonic N',N',N'',N''-tetraethyldiamide was prepared according to formulation B. A portion of the solution was diluted with light mineral oil to make a sprayable solution of the compound. The solution was sprayed on two-week old Black Valentine beans at application rates equivalent to 0.1, 1.0 and 10.0 lbs. of the compound per acre at concentrations of 0.02%, 0.2% and 2.0%, respectively.

At 0.1 lb. per acre, 5% of the leaves desiccated in 2 days; and 12.5% of the leaves abscissed in 14 days.

At 1.0 lb. per acre, about 8% of the leaves desiccated in 1 day and about 30% in 7 days; 87.5% of the leaves abscissed in 14 days.

At 10.0 lbs. per acre, 75% of the leaves desiccated in 1 day and 90% in 3 days; 100% of the leaves abscissed in 14 days; terminal buds were dead in 7 days.

From the above examples, it readily can be seen that the novel compounds of this invention are useful as desiccants, defoliants and herbicides for plants.

*Example 7*

Crude, otherwise undiluted, N,N-diethylthiocarbamylphosphonic N',N',N'',N''-tetraethyldiamide is sprayed directly on poison ivy plants at an application rate equivalent to 4 lbs. per acre, killing the plants.

*Example 8*

Crude, otherwise undiluted, N,N-diethylcarbamylphosphonic N',N',N'',N''-tetraethyldiamide is sprayed directly on a wooded area at an application rate equivalent to 50 lbs. per acre, killing the trees.

*Example 9*

Crude, otherwise undiluted N,N-diethylthiocarbamylphosphonic N',N',N'',N''-tetraethyldiamide is sprayed directly on aquatic vegetation at an application rate equivalent to 10 lbs. per acre, killing the vegetation.

*Example 10*

Crude, otherwise undiluted, N,N-diethylcarbamylphosphonic N',N',N'',N''-tetraethyldiamide is sprayed directly on ragweed at an application rate equivalent to 20 lbs. per acre, killing the ragweed.

*Example 11*

Crude, otherwise undiluted, N,N-diethylthiocarbamylphosphonic N',N',N'',N''-tetraethyldiamide is sprayed directly on ripe or nearly ripe alfalfa plants at an application rate equivalent to about 2 lbs. per acre, desiccating the plants to facilitate harvesting.

*Example 12*

Crude, otherwise undiluted, N,N-diethylcarbamylphosphonic N',N',N'',N''-tetraethyldiamide is sprayed directly on ripe or nearly ripe cotton plants at an application rate equivalent to 6 lbs. per acre, desiccating and defoliating the plants to facilitate harvesting with mechanical pickers.

The dialkylcarbamylphosphonic diamides and dialkylthiocarbamylphosphonic diamides of this invention are employed as plant treatment agents at full strength either as crude or purified compounds. They can also be applied in plant responsive amounts in a variety of formulations both in liquid and solid composition form and including liquid solutions, concentrates, emulsifiable concentrates, slurries, finely-divided powders, granular materials and pastes. The compounds are employed in the above compositions as the sole essential ingredient, but can be mixed and used with other active agents having pesticidal or plant responsive properties. The compositions can also include carriers, e.g. diluents, extenders, fillers, conditioners, oils, solvents and water. Thus they can include, in dust formulations, various clays, diatomaceous earth, talc, and powdered proteinaceous materials such as powdered cereal wastes. Solvents which can be used include acetone, kerosene, benzene, toluene, xylene, various naphthas, e.g. Stoddard solvent, and other petroleum distillate fractions or mixtures thereof. It is desirable to use, both with the liquid and with dry mixtures intended for use in liquid dispersion form, a wetting, emulsifying or dispersing agent to facilitate use of the formulation, e.g. a non-ionic surfactant such as a nonyl phenoxy polyether alcohol.

The compounds of this invention preferably are applied as plant treatment agents in liquid form, e.g. as an emulsion in water or as a solution in a hydrocarbon oil, essentially containing by weight from at least about 0.01, and preferably from about 0.05% to about 15% of at least one of said compounds. The compounds are similarly applied in dust form, e.g. as a dusting clay, essentially containing by weight at least about 0.01 and preferably from about 0.05% to about 20% of at least one of said compounds.

The compositions containing the compounds of this invention are applied to economic plants preferably near or at the harvesting period to desiccate and defoliate the plants and thereby to facilitate harvesting of the crop, e.g. corn, cotton, beans. However, they can be applied at any time to kill vegetation, using an herbicidal amount of one of the compounds. The compositions are applied to shrubs and trees to strip them of leaves for gardening purposes, such as transplanting. The compositions are applied to uneconomic plants, such as weeds, e.g. poison ivy, ragweed, and other unwanted vegetation including trees, to kill them.

The quantity of active compound of this invention to be used per acre in each case can readily be determined by the usual test plot methods known to the art and will range from at least about 0.1 to about 50 lbs. or more per acre, depending on whether desiccation, defoliation or a combination of both, or herbicidal effect is desired, and the type of vegetation.

The novel compounds of this invention also are useful as pesticides, particularly as acaricides, and more particularly for controlling and killing two-spotted mites and other acarides, as can be seen from the following example.

*Example 13*

36.5 parts of ethyl N',N',N'',N''-tetraethylphosphorodiamidite and 23 parts of N,N-diethylthiocarbamyl chloride were mixed together in a vessel and heated at 135–150° C. for about 1 hour. The temperature was then raised to about 165° C. for 15 minutes. 87% of the theoretical amount of by-product ethyl chloride expected to be formed was collected. Crude N,N-diethylthiocarbamylphosphonic N',N',N'',N''-tetraethyldiamide remained in the vessel as the residue and reaction product.

Identity of the product as N,N-diethylthiocarbamylphosphonic N',N',N'',N''-tetraethyldiamide was further confirmed by detrimination of its infrared spectrum, which showed the following characteristic absorptions:

1488 cm.$^{-1}$, >N—C(S)—
1220–1183 cm.$^{-1}$, P→O
714 cm.$^{-1}$, P—N
Some absorption at 1650 and 3460 cm.$^{-1}$ indicating presence of —N<

The crude N,N - diethylthiocabamylphosphonic N',N',N'',N''-tetraethyldiamide was dissolved in acetone to form a solution having a concentration of 0.0625 percent of the compound. The solution was applied as a contact spray on two-spotted mites (*Tetranychus bimaculatus* Harvey) for 24 hours. The results as compared to acetone used alone were as follows:

| Test No. | Composition | Amount, ml. | Percent Conc. | Percent Kill | Average Percent Kill |
|---|---|---|---|---|---|
| 2239-1 | Acetone | 3 | 100 | 0 | |
| 2239-2 | ----do---- | 3 | 100 | 1 | |
| 2239-3 | ----do---- | 3 | 100 | 1 | 1 |
| 2241-1 | Ethyl-N,N,N', N'-tetraethylphosphorodiamidite. | 3 | 0.0625 | 10 | |
| 2241-2 | ----do---- | 3 | 0.0625 | 10 | |
| 2241-3 | ----do---- | 3 | 0.0625 | 10 | 10 |

The compounds of this invention are employed as acaricides either directly, undiluted, or in acaricidal amounts in a variety of compositions both in liquid and solid composition form and including liquid solutions, concentrates, emulsifiable concentrates, slurries, finely-divided powders, granular materials and pastes. The compounds are employed in compositions either as the essential acaricidal ingredient alone, or with other pesticides. Said compositions can also include diluents, extenders, fillers, conditioners, solvents and water. Thus they can include, in dust formulations, various clays, diatomaceous earth, talc, and powdered proteinaceous materials such as powdered cereal wastes. Solvents which can be used include acetone, kerosene, benzene, toluene, xylene, various naphthas, e.g. Stoddard solvent, and other petroleum distillate fractions or mixtures thereof. It is desirable to use, both with the liquid and with dry mixtures intended for use in liquid dispersion form, a wetting, emulsifying or dispersing agent to facilitate use of the formulation, preferably a non-ionic surfactant.

The compounds of this invention are preferably applied as acaricides in liquid form, e.g. as an emulsion in water or a solution in a hydrocarbon oil, essentially containing by weight at least about 0.005% and preferably from about 0.01% to about 15% of at least one of said compounds. The compounds are similarly applied in dust form, e.g. as an acaricidal clay, essentially containing by weight at least 0.005% and preferably from about 1% to about 20% of at least one of said compounds.

The compositions containing the compounds of the invention are applied to the locus to be protected, preferably habitat of acarids, for example, the area around and on economic plants already infested with acarids or to plants on which infestation is to be prevented through activity of the composition. Thus the compositions can be applied, for example, to bean plants, flowering shrubs and fruit trees.

The amount of active compound applied in such case must be less than an amount that will harm the plant if no plant responsive effect is desired. A quantity from at least about 0.01 lb. and preferably from about .01 to about 0.1 lb. per acre is preferably used on such plants. However, where it is not necessary to preserve the plant or where plants are not involved a larger quantity of a compound of this invention readily can be used.

A typical acaricidal composition is prepared by slurrying in acetone 20 parts by weight of dialkylcarbamylphosphonic or dialkylthiocarbamylphosphonic diamide, e.g. N,N - diethylthiocarbamylphosphine, N,N',N'',N'' - tetraethyldiamide or N,N-diethylcarbamylphosphonic - N',N', N'',N''-tetraethyldiamide with 75 parts of attapulgite clay and 5 parts of a sodium salt of an alkylaryl sulfonic acid surface active agent. The acetone is evaporated. The composition is then ball milled to pass through 100 mesh Tyler standard sieve. On dispersal in water, the composition can be applied to young bean plants for control of the two-spotted spider mite.

In the ways disclosed above, other dialkylcarbamylphosphonic diamides and dialkylthiocarbamylphosphonic diamides can be prepared and used as acaricides.

It is to be understood that although the invention has been described with specific reference to particular embodiments, it is not limited to such embodiments, and the invention is intended to include all modifications within the scope and spirit of the appended claims.

I claim:

1. A defoliating composition comprising as an essential defoliating ingredient a compound of the formula

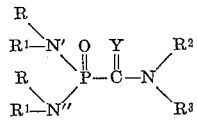

in which R is selected from the group consisting of hydrogen, hydrocarbon and substituted hydrocarbon; $R^1$, $R^2$ and $R^3$ are each selected from the group consisting of hydrocarbon and substituted hydrocarbon; and Y is selected from the group consisting of oxygen and sulfur dispersed in a carrier for defoliants.

2. A defoliaitng composition comprising as an essential defoliating ingredient a compound according to claim 1 in which each of R, $R^1$, $R^2$ and $R^3$ is a lower alkyl radical and Y is sulfur dispersed in a carrier for defoliants.

3. A defoliating composition comprising as an essential defoliating ingredient a compound according to claim 1 in which each of R, $R^1$, $R^2$ and $R^3$ is a lower radical and Y is oxygen dispersed in a carrier for defoliants.

4. A defoliating composition comprising, as an essential defoliating ingredient, the compound N,N-diethylthiocarbamylphosphonic N', N', N'', N''-tetraethyldiamide dispersed in a carrier for defoliants.

5. A defoliating composition comprising as an essential defoliating ingredient the compound N,N-diethylcarbamylphosphonic N', N', N'', N''-tetraethyldiamide dispersed in a carrier for defoliants.

6. A method for defoliating vegetation which comprises placing upon said vegetation a defoliating quantity of a compound of the formula

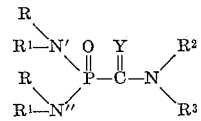

in which R is selected from the group consisting of hydrogen, hydrocarbon and substituted hydrocarbon; $R^1$, $R^2$ and $R^3$ are each selected from the group consisting of hydrocarbon and substituted hydrocarbon; and Y is selected from the group consisting of oxygen and sulfur.

7. A method for defoliating vegetation which comprises placing upon said vegetation a defoliating quantity of a compound according to claim 1 in which each of R, $R^1$, $R^2$ and $R^3$ is a lower alkyl radical and Y is sulfur.

8. A method for defoliating vegetation which comprises placing upon said vegetation a defoliating quantity of a compound according to claim 1 in which each of R, $R^1$, $R^2$ and $R^3$ is a lower alkyl radical and Y is oxygen.

9. A method for defoliating vegetation which comprises placing upon said vegetation a defoliating quantity of N,N-diethylthiocarbamylphosphonic N',N',N'',N''-tetraethyldiamide.

10. A method for defoliating vegetation which comprises placing upon said vegetation a defoliating quantity of N,N-diethylcarbamylphosphonic N',N',N'',N'' - tetraethyldiamine.

11. An herbicidal composition comprising as an essential herbicidal ingredient a compound of the formula

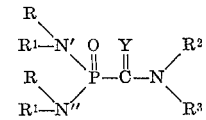

in which R is selected from the group consisting of hydrogen, hydrocarbon and substituted hydrocarbon; $R^1$, $R^2$ and $R^3$ are each selected from the group consisting of hydrocarbon and substituted hydrocarbon; and Y is selected from the group consisting of oxygen and sulfur dispersed in a carrier for herbicides.

12. An herbicidal composition comprising as an essential herbicidal ingredient a compound according to claim 1 in which each of R, $R^1$, $R^2$ and $R^3$ is a lower alkyl radical and Y is sulfur dispersed in a carrier for herbicides.

13. An herbicidal composition comprising as an essential herbicidal ingredient a compound according to claim 1 in which each of R, $R^1$, $R^2$ and $R^3$ is a lower alkyl radical and Y is oxygen dispersed in a carrier for herbicides.

14. An herbicidal composition comprising as an essential herbicidal ingredient the compound of N,N-diethylthiocarbamylphosphonic N',N',N'',N'' - tetraethyldiamide dispersed in a carrier for herbicides.

15. An herbicidal composition comprising as an essential herbicidal ingredient the compound of N,N-diethylcarbamylphosphonic N',N',N'',N''-tetraethyldiamide dispersed in a carrier for herbicides.

16. A method for destroying and controlling undesired vegetation which comprises placing upon said vegetation a phytotoxic quantity of a compound of the formula

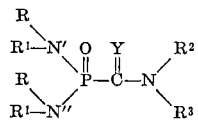

in which R is selected from the group consisting of hydrogen, hydrocarbon and substituted hydrocarbon; $R^1$, $R^2$ and $R^3$ are each selected from the group consisting of hydrocarbon and substituted hydrocarbon; and Y is selected from the group consisting of oxygen and sulfur.

17. A method for destroying and controlling undesired vegetation which comprises placing upon said vegetation a phytotoxic quantity of a compound according to claim 1 in which each of R, $R^1$, $R^2$ and $R^3$ is a lower alkyl radical and Y is sulfur.

18. A method for destroying and controlling undesired vegetation which comprises placing upon said vegetation a phytotoxic quantity of a compound according to claim 1 in which each of R, $R^1$, $R^2$ and $R^3$ is a lower alkyl radical and Y is oxygen.

19. A method for destroying and controlling undesired vegetation which comprises placing upon said vegetation a phytotoxic quantity of N,N-diethylthiocarbamylphosphonic N',N',N'',N''-tetraethyldiamide.

20. A method for destroying and controlling undesired vegetation which comprises placing upon said vegetation a phytotoxic quantity of N,N-diethylcarbamylphosphonic N',N',N'',N''-tetraethyldiamide.

21. A method for desiccating vegetation which comprises placing upon said vegetation a desiccating quantity of a compound of the formula

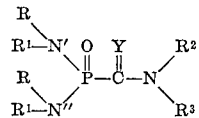

in which R is selected from the group consisting of hydrogen, hydrocarbon and substituted hydrocarbon; $R^1$, $R^2$ and $R^3$ are each selected from the group consisting of hydrocarbon and substituted hydrocarbon; and Y is selected from the group consisting of oxygen and sulfur.

22. A method for desiccating vegetation which comprises placing upon said vegetation a desiccating quantity of a compound according to claim 1 in which each of R, $R^1$, $R^2$ and $R^3$ is a lower alkyl radical and Y is sulfur.

23. A method for desiccating vegetation which comprises placing upon said vegetation a desiccating quantity of a compound according to claim 1 in which each of R, $R^1$, $R^2$ and $R^3$ is a lower alkyl radical and Y is oxygen.

24. A method for desiccating vegetation which comprises placing upon said vegetation a desiccating quantity of the compound N,N-diethylthiocarbamylphosphonic N',N',N'',N''-tetraethyldiamide.

25. A method for desiccating vegetation which comprises placing upon said vegetation a desiccating quantity of the compound N,N-diethylcarbamylphosphonic N',N',N'',N''-tetraethyldiamide.

References Cited by the Examiner
UNITED STATES PATENTS

| | | | |
|---|---|---|---|
| 2,714,064 | 7/1955 | Morris et al. | 71—2.3 |
| 2,719,167 | 9/1955 | Schmidt | 260—551 |
| 2,957,018 | 10/1960 | Baker | 260—461 |
| 2,993,776 | 7/1961 | Chupp | 71—2.7 |
| 3,066,140 | 11/1962 | Speziale | 260—943 |

LEWIS GOTTS, *Primary Examiner.*

JAMES O. THOMAS, Jr., *Assistant Examiner.*